(12) United States Patent
Raschke et al.

(10) Patent No.: US 12,527,731 B2
(45) Date of Patent: *Jan. 20, 2026

(54) ACRYLATE-FREE COSMETIC EMULSION

(71) Applicant: BEIERSDORF AG, Hamburg (DE)

(72) Inventors: Thomas Raschke, Pinneberg (DE); Keti Piradashvili, Hamburg (DE)

(73) Assignee: BEIERSDORF AG, Hamburg (DE)

( * ) Notice: Subject to any disclaimer, the term of this patent is extended or adjusted under 35 U.S.C. 154(b) by 1134 days.

This patent is subject to a terminal disclaimer.

(21) Appl. No.: 17/271,261

(22) PCT Filed: Jul. 3, 2019

(86) PCT No.: PCT/EP2019/067803
§ 371 (c)(1),
(2) Date: Feb. 25, 2021

(87) PCT Pub. No.: WO2020/043365
PCT Pub. Date: Mar. 5, 2020

(65) Prior Publication Data
US 2021/0338559 A1 Nov. 4, 2021

(30) Foreign Application Priority Data
Aug. 28, 2018 (DE) .......................... 102018214478.8

(51) Int. Cl.
| A61K 31/277 | (2006.01) |
| A61K 8/06 | (2006.01) |
| A61K 8/37 | (2006.01) |
| A61K 8/44 | (2006.01) |
| A61K 8/46 | (2006.01) |
| A61K 8/73 | (2006.01) |
| A61Q 19/00 | (2006.01) |

(52) U.S. Cl.
CPC .............. *A61K 8/732* (2013.01); *A61K 8/062* (2013.01); *A61K 8/375* (2013.01); *A61K 8/442* (2013.01); *A61K 8/463* (2013.01); *A61Q 19/00* (2013.01); *A61K 2800/10* (2013.01); *A61K 2800/30* (2013.01); *A61K 2800/34* (2013.01); *A61K 2800/52* (2013.01)

(58) Field of Classification Search
None
See application file for complete search history.

(56) References Cited

U.S. PATENT DOCUMENTS

| 6,248,338 B1 | 6/2001 | Muller et al. |
| 2005/0074471 A1 | 4/2005 | Bleckmann et al. |
| 2018/0243189 A1 | 8/2018 | Pruns |

FOREIGN PATENT DOCUMENTS

| CN | 104984206 A | * | 10/2015 | |
| CN | 105434307 B | | 7/2018 | |
| DE | 19627498 A1 | | 1/1998 | |
| DE | 10113048 A1 | | 9/2002 | |
| DE | 29924371 U1 | | 11/2002 | |
| DE | 10148825 A1 | | 4/2003 | |
| DE | 102004052833 A1 | * | 5/2006 | ........... A61K 8/4946 |
| DE | 19938756 A1 | | 1/2011 | |
| DE | 102014104255 A1 | | 10/2015 | |
| WO | WO-2018044003 A1 | * | 3/2018 | ............... A61K 8/06 |
| WO | 2020043363 A1 | | 3/2020 | |

OTHER PUBLICATIONS

Anonymous, "Rejuvenating Face Wash", GNPD, MINTEL, (Oct. 20, 2017), Database accession No. 5178271, URL: www.gnpd.com.
Anonymous, "After Sun Repair Lotion", GNPD, MINTEL, (Sep. 21, 2011), Database accession No. 1625513, URL: www.gnpd.com.
Anonymous, "Cleanser", GNPD, MINTEL, (Mar. 13, 2013), Database accession No. 2016848, URL: www.gnpd.com.

* cited by examiner

Primary Examiner — Layla Soroush
(74) Attorney, Agent, or Firm — Abel Schillinger, LLP

(57) ABSTRACT

Acrylate-free cosmetic O/W emulsion containing: at least one substance selected from the group sodium stearoyl glutamate, alkali metal alkyl sulphates, and alkali metal alkyl phosphates, wherein the alkyl group in each case has 16 to 18 carbon atoms; hydroxypropyl starch phosphate; and glycerol monostearate and/or sorbitan monostearate.

11 Claims, No Drawings

ACRYLATE-FREE COSMETIC EMULSION

BACKGROUND OF THE INVENTION

1. Field of the Invention

The present invention relates to an acrylate-free cosmetic O/W emulsion.

2. Discussion of Background Information

Cosmetic products generally not only serve to appear beautiful and attractive, but their effects make a decisive contribution to increased self-esteem and people's wellbeing. Accordingly, a wide variety of cosmetic products are used for daily cleansing and care of human skin.

Skin care products generally consist of emulsions. Emulsions are generally understood to mean heterogeneous systems composed of two liquids that are immiscible, or of only limited miscibility, with each other, which are typically referred to as phases and in which one of the two liquids is dispersed in the other liquid in the form of very fine droplets. Externally and viewed with the naked eye, emulsions appear homogeneous.

If the two liquids are water and oil and oil droplets are present finely distributed in water, it is an oil-in-water emulsion (O/W emulsion, milk for example). The basic character of an O/W emulsion is influenced by the water. The reverse principle applies to a water-in-oil emulsion (W/O emulsion, butter for example), wherein the basic character in this case is determined by the oil.

To stabilize and thicken O/W emulsions, acrylate-based polymers are usually incorporated into these formulations. The acrylate-based polymers include polymers which are obtained from homo- or copolymerization with acrylic acid and/or methacrylic acid. Examples include, inter alia, carbomer or acrylate copolymers.

The prior art includes, inter alia, documents DE 10148825 A1, DE 19938756 A1 and DE 29924371 U1, which disclose skincare O/W emulsions with acrylate-based polymers. However, the use of these acrylate-based polymers is increasingly being criticized as their biodegradability has not been fully clarified.

In contrast to acrylate-based polymers, polymers based on polysaccharides are obtained from renewable raw materials, which are readily biodegradable and are often inexpensive.

However, the problem is that a simple exchange of acrylate-based polymers for polymers based on polysaccharides is often not possible, since these biphasic formulations usually do not have the necessary long-term stability and this results in an undesired phase separation of the O/W emulsion. This occurs in particular when the oil phase of the emulsion is present at a proportion of more than 3% by weight, preferably more than 5% by weight, based on the total weight of the emulsion. Another problem is the fact that when using polymers based on polysaccharides, the formulations are not absorbed rapidly enough when applied to the skin and often leave significant amounts of white residues. Therefore, such formulations are often described by the consumer as unpleasant. Instead, the consumer desires formulations that are rapidly absorbed without leaving residues, and thus have a light texture. Therefore, a simple exchange of acrylate-based polymers for polymers based on polysaccharides results in considerable product disadvantages.

The object of the present invention, therefore, was to provide an acrylate-free cosmetic O/W emulsion which does not have the disadvantages of the prior art. In particular, the object was to provide an O/W emulsion with polymers based on polysaccharides which are more temperature-stable. In addition, it was an object to provide O/W emulsions which are rapidly absorbed when applied and have lower amounts of residues.

SUMMARY OF THE INVENTION

Surprisingly, the object(s) is/are achieved by an acrylate-free cosmetic O/W emulsion comprising
  a) at least one substance selected from the group sodium stearoyl glutamate, alkali metal alkyl sulfates and alkali metal alkyl phosphates, wherein the alkyl group has in each case 16 to 18 carbon atoms,
  b) hydroxypropyl starch phosphate, and
  c) glycerol monostearate and/or sorbitan monostearate.

The invention also relates to the use of a mixture composed of
  a) at least one substance selected from the group sodium stearoyl glutamate, alkali metal alkyl sulfates and alkali metal alkyl phosphates, wherein the alkyl group has in each case 16 to 18 carbon atoms,
  b) hydroxypropyl starch phosphate, and
  c) glycerol monostearate and/or sorbitan monostearate
to prevent phase separation in an acrylate-free O/W emulsion.

If percentages by weight (% by weight) are given below without reference to a particular composition or specific mixture, then these figures always refer to the total weight of the cosmetic O/W emulsion. If ratios of components/substances/substance groups are disclosed below, these ratios refer to ratios by weight of the components/substances/substance groups specified.

If ranges of percentages by weight are given below for the constituents of the cosmetic O/W emulsion, the disclosure of the present application also includes all individual values in steps of 0.1% by weight within these weight percentage ranges.

The expressions "according to the invention", "advantageous according to the invention", "advantageous in the context of the present invention" etc. always relate in the context of the present disclosure to both the preparation according to the invention and the use according to the invention.

All experiments were carried out under standard conditions unless stated otherwise. The expression "standard conditions" signifies 20° C., 1013 hPa and a relative humidity of 50%.

If the term skin is used, this preferably refers to human skin.

The O/W emulsion according to the invention is acrylate-free. In the context of the present invention, acrylate-free means that the total proportion of acrylate-based polymers is less than 0.2% by weight, preferably less than 0.1% by weight and more preferably less than 0.05% by weight and especially preferably 0% by weight, where the figures refer to the total weight of the emulsion. In accordance with the invention, acrylate-based polymers are understood to mean all polymers which are obtained from a homopolymerization or copolymerization with acrylic acid and/or methacrylic acid.

In accordance with the invention, the cosmetic O/W emulsion comprises a substance selected from the group sodium stearoyl glutamate, alkali metal alkyl sulfates and alkali metal alkyl phosphates, wherein the alkyl group has in each case 16 to 18 carbon atoms.

Among the alkali metal alkyl sulfates, preference is given to using sodium cetyl sulfate, sodium stearyl sulfate and mixtures thereof known by the name sodium cetearyl sulfate.

In addition, among the alkali metal alkyl phosphates, preference is given to using potassium cetyl phosphate.

The invention therefore preferably relates to an acrylate-free cosmetic O/W emulsion comprising,
  a) at least one substance selected from the group sodium stearoyl glutamate, sodium cetyl sulfate, sodium stearyl sulfate, sodium cetearyl sulfate and potassium cetyl phosphate,
  b) hydroxypropyl starch phosphate, and
  c) glycerol monostearate and/or sorbitan monostearate.

The substances of the group of the alkali metal alkyl sulfates, alkali metal alkyl phosphates and sodium stearoyl glutamate may be used in accordance with the invention as a mixture or as an individual component.

The invention therefore further preferably relates to an acrylate-free cosmetic O/W emulsion containing,
  a) sodium stearoyl glutamate,
  b) hydroxypropyl starch phosphate, and
  c) glycerol monostearate and/or sorbitan stearate.

The invention further preferably relates to an acrylate-free cosmetic O/W emulsion containing,
  a) sodium cetyl sulfate, sodium stearyl sulfate and/or sodium cetearyl sulfate,
  b) hydroxypropyl starch phosphate, and
  c) glycerol monostearate and/or sorbitan monostearate.

The invention further preferably relates to an acrylate-free cosmetic O/W emulsion containing,
  a) at least one substance selected from the group of the alkali metal alkyl phosphates, characterized in that the alkyl group has in each case 16 to 18 carbon atoms, wherein the substance is particularly preferably sodium cetyl phosphate,
  b) hydroxypropyl starch phosphate, and
  c) glycerol monostearate and/or sorbitan monostearate.

It is furthermore advantageous in accordance with the invention when the substances mentioned in each case above under a) are present in a total proportion of from 0.01% by weight to 5.0% by weight, more preferably from 0.05% by weight to 2.0% by weight and most preferably from 0.1% by weight to 1.5% by weight, based on the total weight of the emulsion.

It is furthermore advantageous in the context of the present invention if the proportion of hydroxypropyl starch phosphate is from 0.1% by weight to 10% by weight, preferably from 0.2% by weight to 5.0% by weight and particularly preferably from 0.5% to 3% by weight, based on the total weight of the emulsion.

In general, hydroxypropyl starch phosphate is an esterification product based on starch. In accordance with the invention, it is possible to use hydroxypropyl starch phosphate based on different starches. Wheat or potato starch, inter alia, are known to those skilled in the art.

Surprisingly, however, it has been found by those skilled in the art that if the hydroxypropyl starch phosphate used is an esterification product based on corn starch, the O/W emulsion according to the invention is significantly less sticky on the skin than if other starch sources are used. Advantageous embodiments of the present invention are thus characterized in that the hydroxypropyl starch phosphate used is an esterification product based on corn starch. Within these embodiments, it is further preferred when the proportion of hydroxypropyl starch phosphate, which is an esterification product based on corn starch, is from 0.1% by weight to 10% by weight, preferably from 0.2% by weight to 5.0% by weight and particularly preferably from 0.5% by weight to 3% by weight, based on the total weight of the emulsion.

A hydroxypropyl starch phosphate according to the invention based on corn starch can be obtained from Cargill under the trade name C*HiForm A 12747.

It is also advantageous according to the invention if the total proportion of glycerol monostearate and/or sorbitan monostearate is from 0.1% by weight to 5.0% by weight, preferably 0.2% by weight to 3.0% by weight and particularly preferably from 0.5% by weight to 2.5% by weight, wherein the figures refer to the total weight of the emulsion.

Further advantageous O/W emulsions according to the invention comprise glycerol monostearate at a proportion of 0.1% by weight to 5.0% by weight, preferably 0.2% by weight to 3.0% by weight and particularly preferably 0.5% by weight to 2.5% by weight, wherein the figures refer to the total weight of the emulsion and wherein advantageously sorbitan monostearate is not present.

Further advantageous O/W emulsions according to the invention comprise sorbitan monostearate at a proportion of 0.1% by weight to 5.0% by weight, preferably 0.2% by weight to 3.0% by weight and particularly preferably of 0.5% by weight to 2.5% by weight, wherein the figures refer to the total weight of the emulsion and wherein advantageously glycerol monostearate is not present.

Furthermore, it has been found, surprisingly, that emulsions in particular can be stabilized with the combination according to the invention, which are characterized in that the proportion of the oil phase of the emulsion is more than 3% by weight to 30% by weight, preferably more than 4% by weight to 28% by weight and particularly preferably from more than 5% by weight to 25% by weight, based on the total weight of the emulsion. Therefore, surprisingly, emulsions having a large proportion of oil phases can be stabilized.

In accordance with the invention, emulsifiers and surfactants are not included in the oil phase. This means that glycerol monostearate, sodium alkyl sulfates, potassium cetyl phosphate, glycerol monostearate and sorbitan monostearate inter alia are not part of the oil phase.

Emulsifiers are understood to mean all substances which are listed in the International Cosmetic Ingredient Dictionary and Handbook, Thirteenth Edition 2010, (ISBN 1-882621-47-6) under the designation "emulsifying agent". Surfactants are understood to mean all substances which are listed in the International Cosmetic Ingredient Dictionary and Handbook, Thirteenth Edition 2010, (ISBN 1-882621-47-6) under the designation "surfactant".

A preferred embodiment of the invention is characterized in that the O/W emulsion, based on the total weight of the emulsion, contains
  a) 0.1% by weight to 1.0% by weight at least one substance selected from the group sodium stearoyl glutamate, alkali metal alkyl sulfates and alkali metal alkyl phosphates, wherein the alkyl group has in each case 16 to 18 carbon atoms,
  b) 0.5% by weight to 3.0% by weight hydroxypropyl starch phosphate, and
  c) 0.5% by weight to 2.5% by weight glycerol monostearate and/or sorbitan monostearate,
and the proportion of the oil phase of the emulsion is from more than 5% by weight to 25% by weight.

A further preferred embodiment of the invention is characterized in that the O/W emulsion, based on the total weight of the emulsion, contains a) 0.1% by weight to 1.0% by weight at least one substance selected from the group sodium stearoyl glutamate, alkali metal alkyl sulfates and alkali metal alkyl phosphates, wherein the alkyl group has in each case 16 to 18 carbon atoms,
b) 0.5% by weight to 3.0% by weight hydroxypropyl starch phosphate, and
c) 0.5% by weight to 2.5% by weight glycerol monostearate, and the proportion of the oil phase of the emulsion is from more than 5% by weight to 25% by weight.

A preferred embodiment of the invention is characterized in that the O/W emulsion, based on the total weight of the emulsion, contains
a) 0.1% by weight to 1.0% by weight at least one substance selected from the group sodium stearoyl glutamate, alkali metal alkyl sulfates and alkali metal alkyl phosphates, wherein the alkyl group has in each case 16 to 18 carbon atoms,
b) 0.5% by weight to 3.0% by weight hydroxypropyl starch phosphate, and
c) 0.5% by weight to 2.5% by weight sorbitan monostearate, and the proportion of the oil phase of the emulsion is from more than 5% by weight to 25% by weight.

A preferred embodiment of the invention is characterized in that the O/W emulsion, based on the total weight of the emulsion, contains
a) 0.1% by weight to 1.0% by weight sodium stearoyl glutamate,
b) 0.5% by weight to 3.0% by weight hydroxypropyl starch phosphate, and
c) 0.5% by weight to 2.5% by weight glycerol monostearate and/or sorbitan monostearate, and the proportion of the oil phase of the emulsion is from more than 5% by weight to 25% by weight.

A further preferred embodiment of the invention is characterized in that the O/W emulsion, based on the total weight of the emulsion, contains
a) 0.1% by weight to 1.0% by weight sodium stearoyl glutamate,
b) 0.5% by weight to 3.0% by weight hydroxypropyl starch phosphate, and
c) 0.5% by weight to 2.5% by weight glycerol monostearate, and the proportion of the oil phase of the emulsion is from more than 5% by weight to 25% by weight.

A preferred embodiment of the invention is characterized in that the O/W emulsion, based on the total weight of the emulsion, contains
a) 0.1% by weight to 1.0% by weight sodium stearoyl glutamate,
b) 0.5% by weight to 3.0% by weight hydroxypropyl starch phosphate, and
c) 0.5% by weight to 2.5% by weight sorbitan monostearate, and the proportion of the oil phase of the emulsion is from more than 5% by weight to 25% by weight.

A preferred embodiment of the invention is characterized in that the O/W emulsion, based on the total weight of the emulsion, contains
a) 0.1% by weight to 1.0% by weight sodium cetyl sulfate, sodium stearyl sulfate and/or sodium cetearyl sulfate,
b) 0.5% by weight to 3.0% by weight hydroxypropyl starch phosphate, and
c) 0.5% by weight to 2.5% by weight glycerol monostearate and/or sorbitan monostearate, and the proportion of the oil phase of the emulsion is from more than 5% by weight to 25% by weight.

A further preferred embodiment of the invention is characterized in that the O/W emulsion, based on the total weight of the emulsion, contains
a) 0.1% by weight to 1.0% by weight sodium cetyl sulfate, sodium stearyl sulfate and/or sodium cetearyl sulfate,
b) 0.5% by weight to 3.0% by weight hydroxypropyl starch phosphate, and
c) 0.5% by weight to 2.5% by weight glycerol monostearate, and the proportion of the oil phase of the emulsion is from more than 5% by weight to 25% by weight.

A preferred embodiment of the invention is characterized in that the O/W emulsion, based on the total weight of the emulsion, contains
a) 0.1% by weight to 1.0% by weight sodium cetyl sulfate, sodium stearyl sulfate and/or sodium cetearyl sulfate,
b) 0.5% by weight to 3.0% by weight hydroxypropyl starch phosphate, and
c) 0.5% by weight to 2.5% by weight sorbitan monostearate, and the proportion of the oil phase of the emulsion is from more than 5% by weight to 25% by weight.

A preferred embodiment of the invention is characterized in that the O/W emulsion, based on the total weight of the emulsion, contains
a) 0.1% by weight to 1.0% by weight at least one substance selected from the group of the alkali metal alkyl phosphates, characterized in that the alkyl group has in each case 16 to 18 carbon atoms, wherein the substance is particularly preferably potassium cetyl phosphate,
b) 0.5% by weight to 3.0% by weight hydroxypropyl starch phosphate, and
c) 0.5% by weight to 2.5% by weight glycerol monostearate and/or sorbitan monostearate, and the proportion of the oil phase of the emulsion is from more than 5% by weight to 25% by weight.

A further preferred embodiment of the invention is characterized in that the O/W emulsion, based on the total weight of the emulsion, contains
a) 0.1% by weight to 1.0% by weight at least one substance selected from the group of the alkali metal alkyl phosphates, characterized in that the alkyl group has in each case 16 to 18 carbon atoms, wherein the substance is particularly preferably potassium cetyl phosphate,
b) 0.5% by weight to 3.0% by weight hydroxypropyl starch phosphate, and
c) 0.5% by weight to 2.5% by weight glycerol monostearate, and the proportion of the oil phase of the emulsion is from more than 5% by weight to 25% by weight.

A preferred embodiment of the invention is characterized in that the O/W emulsion, based on the total weight of the emulsion, contains
a) 0.1% by weight to 1.0% by weight at least one substance selected from the group of the alkali metal alkyl phosphates, characterized in that the alkyl group has in each case 16 to 18 carbon atoms, wherein the substance is particularly preferably potassium cetyl phosphate,
b) 0.5% by weight to 3.0% by weight hydroxypropyl starch phosphate, and
c) 0.5% by weight to 2.5% by weight sorbitan monostearate, and the proportion of the oil phase of the emulsion is from more than 5% by weight to 25% by weight.

It has also been shown, surprisingly, that the temperature stability of the O/W emulsion according to the invention could be increased further by adding one or more fatty alcohols having 14 to 22 carbon atoms to the emulsion. The total proportion of these fatty alcohols having 14 to 22 carbon atoms is advantageously from 0.1% by weight to 5.0% by weight, preferably 0.2% by weight to 4.0% by weight and particularly preferably from 0.5% by weight to 3.0% by weight, based on the total weight of the emulsion.

Fatty alcohols to be selected with particular preference are cetyl alcohol and/or stearyl alcohol, wherein these are preferably used at proportions from 0.1% by weight to 5.0% by weight, preferably 0.2% by weight to 4.0% by weight and particularly preferably from 0.5% by weight to 3.0% by weight, based on the total weight of the emulsion.

Advantageous embodiments of the present invention are further characterized in that the O/W emulsion contains further polysaccharide-containing polymers.

The O/W emulsion of these embodiments advantageously contains tapioca starch, wherein the proportion of tapioca starch is preferably in the range from 0.5% by weight to 3.0% by weight, the weight figures referring to the total weight of the O/W emulsion.

In addition, the O/W emulsion of these embodiments advantageously contains one or more further starch phosphates, wherein the total proportion of these additional starch phosphates is preferably in the range of 0.5% by weight to 3.0% by weight, where the weight figures refer to the total weight of the O/W emulsion. The term "further starch phosphates" is understood to mean starch phosphates which are different from hydroxypropyl starch.

In addition, the O/W emulsion of these embodiments advantageously contains xanthan and/or modified xanthan, wherein the total proportion of these polymers is in the range from 0.05% by weight to 0.5% by weight, where the weight figures refer to the total weight of the O/W emulsion.

In addition, the O/W emulsion of these embodiments advantageously comprises carrageenan, wherein the total proportion of carrageenan is in the range from 0.05% by weight to 0.5% by weight, where the weight figures refer to the total weight of the O/W emulsion.

Other advantageous embodiments of the present invention are further characterized in that, besides hydroxypropyl starch phosphate, said emulsion contains no other starches and starch derivatives.

Other advantageous embodiments of the present invention are further characterized in that said emulsion does not contain any celluloses or cellulose derivatives.

Other advantageous embodiments of the present invention are further characterized in that said emulsion does not contain any further polysaccharide-containing polymers.

The features of the O/W emulsion according to the invention described below relate to the O/W emulsion according to the invention per se and in each case to the advantageous embodiments according to the invention described above.

The O/W emulsion according to the invention also advantageously contains one or more lipid components, such as waxes and oils based on hydrocarbons, saturated, unsaturated or hardened triglycerides, dialkyl ethers having 12 to 24 carbon atoms and/or the esters of monohydric alcohols and monocarboxylic acids having at least 10 carbon atoms.

As already stated, it is advantageous if the O/W emulsion of the present invention contains one or more branched and/or unbranched hydrocarbons, provided these are not gaseous under standard conditions. Hydrocarbons that can be used advantageously are paraffinum liquidum, isododecane, isohexadecane, isoeicosane, squalane and cera microcristallina.

The O/W emulsion according to the invention advantageously containa one or more triglycerol esters selected from the group of synthetic, semi-synthetic and natural triglycerol esters. Advantageous natural oils containing such natural triglycerol esters are sunflower oil (*Helianthus annuus* seed oil), rapeseed oil (Canola oil), soybean oil (glycine soya Oil), olive oil (*Olea europaea* fruit oil), almond oil (*Prunus amygdalus dulcis* oil), avocado oil (*Persea gratissima* oil), walnut oil (*Junglans regia* seed oil), peach kernel oil (*Prunus persica* kernel oil), apricot kernel oil (*Prunus armeniaca* kernel oil), sesame oil (*Sesamum indicum* seed oil), Camelia oil (*Camelia oleifera/Camelia sasanqua*), evening primrose oil (*Oenothera biennis*), Macadamia nut oil (*Macadamia intergrifolia* seed oil), diestel oil (*Silybum marianum* seed oil), wheat germ oil (*Triticum vulgare* germ oil), palm kernel oil (*Elaeis guineensis* kernel oil), palm oil (*Elaeis guineensis* oil), grape seed oil (*Vitis vinifera* seed oil), argan oil (*Argania spinosa* seed oil), peanut oil (*Arachis hypogaea* oil), pumpkin seed oil (*Cucurbita pepo* seed oil), castor oil (*Ricinus communis* seed oil), rice germ oil (*Oryza sativa* bran oil), vegetable oil (*Olus* oil) and coconut oil.

If the O/W emulsion contains one or more of the natural oils mentioned above, the proportion of these natural oils is preferably from 0.01% by weight to 3.0% by weight, based on the total weight of the O/W emulsion.

Further preferred triglycerol esters include, inter alia, hardened triglyceride fats, such as hydrogenated palm oil, hydrogenated coconut oil or hydrogenated castor oil. Particular preference is given to the use of hydrogenated coconut oil (hydrogenated coco-glycerides), wherein the proportion of hydrogenated coconut oil is preferably from 0.5% by weight to 3% by weight, based on the total weight of the emulsion.

Furthermore, it is advantageous if the emulsion contains caprylic/capric triglyceride, wherein the proportion of caprylic/capric triglyceride is preferably from 0.5% by weight to 5.0% by weight, based on the total weight of the O/W emulsion.

Furthermore, it is advantageous in the context of the present invention if the O/W emulsion of the present invention contains one or more dialkyl ethers having 12 to 24 carbon atoms, dicaprylyl ether preferably being present. If the O/W emulsion contains dicaprylyl ether, the proportion of dicaprylyl ether is preferably from 0.5% by weight to 3% by weight, based on the total weight of the O/W emulsion.

Furthermore, it is advantageous in the context of the present invention if the O/W emulsion of the present invention contains one or more esters of monohydric alcohols and monocarboxylic acids, the esters having at least 10, preferably at least 15 carbon atoms. Esters of monohydric alcohols and monocarboxylic acids to be advantageously selected are 2-ethylhexyl isostearate, isotridecyl isononanoate, 2-ethylhexyl cocoate, $C_{12-15}$-alkyl benzoate, isopropyl myristate and isopropyl palmitate.

It is also advantageous in the context of the present invention if the O/W emulsion contains octyldodecanol.

It is also preferred in accordance with the invention if the O/W emulsion does not contain any silicone oils. Silicone oils often have the effect that emulsions feel particularly light and absorb rapidly. Surprisingly, it has been found that the emulsion according to the invention is absorbed particularly rapidly after application to skin, even without the presence of silicone oils.

It is also advantageous according to the invention if the O/W emulsion contains propylene glycol, butylene glycol, 2-methylpropane-1,3-diol, 1,2-pentanediol, 1,2-hexanediol, 1,2-octanediol, or glyceryl caprylate and/or 1,2-decanediol.

In addition, it is also advantageous in the context of the present invention if the O/W emulsion contains phenoxyethanol, methylparaben, ethylparaben, dehydroacetic acid and/or ethylhexylglycerol.

If the O/W emulsion contains phenoxyethanol, it is preferred if the proportion of phenoxyethanol is from 0.1% by weight to 1.0% by weight, based on the total weight of the O/W emulsion.

If the O/W emulsion contains methylparaben and/or ethylparaben, it is preferred if the total proportion of methylparaben and/or ethylparaben is from 0.01% by weight to 0.5% by weight, based on the total weight of the O/W emulsion.

It is also advantageous if embodiments of the invention are characterized in that these contain ethanol. If ethanol is present in the O/W emulsion, the proportion of ethanol is preferably from 0.5% by weight to 10% by weight, based on the total weight of the O/W emulsion.

Furthermore, the O/W emulsion according to the invention is preferably characterized in that said emulsion contains glycerol at a proportion of 0.5% by weight to 15% by weight, based on the total weight of the O/W emulsion.

Furthermore, it is preferred if the O/W emulsion, in addition to the emulsifiers and surfactants according to the invention, only contains further surfactants and/or emulsifiers at a maximum proportion of 2% by weight, preferably at a maximum proportion of 1% by weight and particularly preferably does not contain any further emulsifiers and surfactants, wherein the figures refer to the total weight of the emulsion.

Last but not least, embodiments advantageous according to the invention are characterized in that the O/W emulsion contains one or more active ingredients selected from the group of the compounds glycyrrhetic acid, urea, arctiin, folic acid, coenzyme Q10 (ubiquinone), alpha-glucosylrutin, carnitine, carnosine, caffeine, natural and/or synthetic isoflavonoids, glycerylglucose, creatine, creatinine, taurine, tocopherol, tocopherol acetate, vitamin C, vitamin C phosphate, vitamin C palmitate, niacinamide, vitamin A palmitate, panthenol, licochalcone A, rucinol, N-[(2,4-dihydroxyphenyl)thiazol-2-yl]isobutyramide, honokiol and magnolol (also as constituent of *magnolia* extract), hyaluronic acid and/or silymarin (milk thistle extract).

Furthermore, O/W emulsions advantageous according to the invention are characterized in that said emulsions contains water at a proportion of 60% by weight to 95% by weight and preferably from 70% by weight to 90% by weight, based on the total weight of the emulsion.

Furthermore, O/W emulsions advantageous according to the invention have a viscosity of 4000 mPas to 10 000 mPas. If viscosity is referred to in this disclosure, all values relate to measurement at 25° C. in a 150 ml snap-lid bottle using a Rheomat R 123 from proRheo. The Rheomat R 123 from proRheo GmbH is a rotational viscometer, i.e. a measurement body rotates in the substance to be measured. The force is measured that is required to rotate the measurement body in the sample at a predefined speed. From this torque, the speed of the measurement body and the geometric dimensions of the measuring system used, the viscosity is calculated. The measurement body used is measurement body No. 1 (article no. 200 0191), speed range 62.5 min$^{-1}$. All viscosity measurements are always carried out 24 hours after preparation of the O/W emulsion.

DETAILED DESCRIPTION OF EXEMPLARY EMBODIMENTS OF THE INVENTION

Comparative Experiments and Examples

The examples below are intended to illustrate the present invention without limiting it. Unless otherwise stated, all quantitative data, fractions, and percentages are based on the weight and the total amount or on the total weight of the preparations.

The following tables list the example formulations Ex. 1 to Ex. 13, in which only the example formulations Ex. 4 to 7 and 10 to 13 disclose O/W emulsions according to the invention. The other example formulations are not in accordance with the invention. Comparison of the O/W emulsions according to the invention and those not according to the invention shows that the O/W emulsions according to the invention do not show any phase separation and are thus significantly more stable at elevated temperatures.

The O/W emulsions are produced by heating phase A and phase C to 75° C. until all components have dissolved. The phases are then mixed. The mixture is homogenized and then cooled to room temperature with stirring. Phase B is stirred into 60 mL of water (separately from phase A) and, after phase D, is added to the emulsion. The emulsion is then homogenized again.

| Phase | Ingredients | Ex. 1 | Ex. 2 | Ex. 3 | Ex. 4 |
|---|---|---|---|---|---|
| A | Glycerol | 5 | 5 | 5 | 5 |
|   | Aqua | To 100 | To 100 | To 100 | To 100 |
|   | Sodium cetearyl sulfate | 0.2 | 0.2 | 0.2 | 0.2 |
| B | Hydroxypropyl starch phosphate[1] | — | — | 2.5 | 2.5 |
|   | Tapioca starch | — | — | — | — |
|   | Distarch phosphate | — | — | — | — |
| C | Cetyl alcohol | 2 | 2 | 2 | 2 |
|   | Hydrogenated coco-glycerides | 2 | 2 | 2 | 2 |
|   | Dicaprylyl ether | 3.8 | 3.8 | 3.8 | 3.8 |
|   | Caprylic/capric triglyceride | 4 | 4 | 4 | 4 |
|   | Glyceryl stearate | — | 1 | — | 1 |
| D | Phenoxyethanol | 0.8 | 0.8 | 0.8 | 0.8 |
|   | Trisodium EDTA | 0.2 | 0.2 | 0.2 | 0.2 |
|   | Methylparabens | 0.3 | 0.3 | 0.3 | 0.3 |

-continued

| Phase | Ingredients | Ex. 1 | Ex. 2 | Ex. 3 | Ex. 4 |
|---|---|---|---|---|---|
| Storage | | | | | |
| | at 40° C. for 7 days | Phase separation | Phase separation | Phase separation | Stable |
| | at 50° C. for 7 days | Phase separation | Phase separation | Phase separation | Stable |
| Properties when applied to skin | | | | | No residues, rapid absorption on skin |

[1] commercial product: C*HiForm A 12747 from Cargill

| Phase | Ingredients | Ex. 5 | Ex. 6 | Ex. 7 | Ex. 8 | Ex. 9 |
|---|---|---|---|---|---|---|
| A | Glycerol | 5 | 5 | 5 | 5 | 5 |
| | Aqua | To 100 | To 100 | To 100 | To 100 | To 100 |
| | Sodium cetearyl sulfate | 1.5 | 0.2 | 0.2 | 0.2 | 0.2 |
| B | Hydroxypropyl starch phosphate[1] | 2.5 | 5.5 | 2.5 | — | — |
| | Tapioca starch | — | — | — | 2.5 | — |
| | Distarch phosphate | — | — | — | — | 2.5 |
| C | Cetyl alcohol | 2 | 2 | 2 | 2 | 2 |
| | Hydrogenated coco-glycerides | 2 | 2 | 2 | 2 | 2 |
| | Dicaprylyl ether | 3.8 | 3.8 | 3.8 | 3.8 | 3.8 |
| | Caprylic/capric triglyceride | 4 | 4 | 4 | 4 | 4 |
| | Glyceryl stearate | 1 | 1 | 3.5 | 1 | 1 |
| D | Phenoxyethanol | 0.8 | 0.8 | 0.8 | 0.8 | 0.8 |
| | Trisodium EDTA | 0.2 | 0.2 | 0.2 | 0.2 | 0.2 |
| | Methylparabens | 0.3 | 0.3 | 0.3 | 0.3 | 0.3 |
| Storage | | | | | | |
| | at 40° C. for 7 days | Stable | Stable | Stable | Phase separation | Phase separation |
| | at 50° C. for 7 days | Stable | Stable | Stable | Phase separation | Phase separation |
| Properties when applied to skin | | Distinct residues, slow absorption | Distinct residues, slow absorption | Distinct residues, slow absorption | | |

[1] commercial product: C*HiForm A 12747 from Cargill

In the examples below, the substances listed in the following table are used in each case.

| Substance A | Sodium stearoyl glutamate, sodium cetyl stearyl sulfate or potassium cetyl phosphate |
|---|---|
| Substance B | Glycerol monostearate or sorbitan monostearate |

This means that if an example preparation comprises the ingredient substance A, this example preparation is shown once with sodium stearoyl glutamate, once with sodium cetyl stearyl sulfate and once with potassium cetyl phosphate. The same applies to substance B.

| Phase | Ingredients | Ex. 10 | Ex. 11 | Ex. 12 | Ex. 13 |
|---|---|---|---|---|---|
| A | Glycerol | 5 | 5 | 5 | 5 |
| | Aqua | To 100 | To 100 | To 100 | To 100 |
| | Substance A | 0.2 | 1.5 | 0.2 | 0.2 |
| B | Hydroxypropyl starch phosphate[1] | 2.5 | 2.5 | 5.5 | 2.5 |
| C | Cetyl alcohol | 2 | 2 | 2 | 2 |
| | Hydrogenated coco-glycerides | 2 | 2 | 2 | 2 |
| | Dicaprylyl ether | 3.8 | 3.8 | 3.8 | 3.8 |
| | Caprylic/capric triglyceride | 4 | 4 | 4 | 4 |
| | Substance B | 1 | 1 | 1 | 3.5 |
| D | Phenoxyethanol | 0.8 | 0.8 | 0.8 | 0.8 |
| | Trisodium EDTA | 0.2 | 0.2 | 0.2 | 0.2 |
| | Methylparabens | 0.3 | 0.3 | 0.3 | 0.3 |

[1] commercial product: C*HiForm A 12747 from Cargill

| Example A O/W cream | wt % |
|---|---|
| Sodium stearoyl glutamate | 0.3 |
| Glycerol monostearate | 3 |
| $C_{12-15}$ Alkyl benzoate | 2 |
| Dicaprylyl ether | 2 |

-continued

| Example A O/W cream | wt % |
|---|---|
| Octyldodecanol | 2 |
| Caprylic acid/capric acid triglycerides | 1 |
| Jojoba oil | 0.5 |
| Tocopheryl acetate | 0.3 |
| Sodium ascorbyl phosphate | 0.1 |
| Phenoxyethanol | 0.7 |
| Hydroxypropyl starch phosphate | 3 |
| Octanediol | 0.3 |
| Benzethonium chloride | 0.05 |
| Pentylene glycol | 2 |
| Glycerol | 7 |
| Fillers/additives (TiO$_2$, BHT) | 0.5 |
| Parfum | as required |
| Water | to 100 |

| Example B O/W day cream | wt % |
|---|---|
| Sodium cetyl stearyl sulfate | 0.2 |
| Sorbitan monostearate | 2 |
| Cetearyl alcohol | 1 |
| C$_{12-15}$ Alkyl benzoate | 3 |
| Caprylic acid/capric acid triglycerides | 2 |
| Dicaprylyl carbonate | 2 |
| Octyldodecanol | 1 |
| Macadamia oil | 0.5 |
| Octocrylene | 2 |
| Ethylhexyl methoxycinnamate | 3 |
| Octyl salicylate | 2 |
| TiO$_2$ | 1 |
| Glycyrrhetinic acid | 0.1 |
| Folic acid | 0.05 |
| Phenoxyethanol | 0.8 |
| Octopirox | 0.1 |
| Hexanediol | 1 |
| EDTA | 0.2 |
| Hydroxypropyl starch phosphate | 2.5 |
| Glycerol | 7 |
| Additives (xanthan gum, BHT) | 0.3 |
| Parfum | as required |
| Water | to 100 | pH 7.0

| Example C O/W day cream | wt % |
|---|---|
| Sodium stearoyl glutamate | 0.3 |
| Sorbitan monostearate | 1 |
| Cetearyl alcohol | 2 |
| Isopropyl palmitate | 3 |
| Ethylhexyl stearate | 1 |
| Hydrogenated coconut fatty acid glycerides (Hydrogenated Coco Glycerides) | 1 |
| C$_{12-15}$ alkyl benzoate | 2 |
| Dibutyl adipate | 1 |
| Tocophol | 0.1 |
| Coenzyme Q10 (ubiquinone) | 0.05 |
| Lactic acid sodium salt | 0.3 |
| Methylpropanediol | 2 |
| Phenoxyethanol | 0.5 |
| Benzyl alcohol | 0.2 |
| Hydroxypropyl starch phosphate | 2 |
| Hyaluronic acid, sodium salt | 0.1 |
| NaOH$_{aq}$ | as required |
| Glycerol | 8 |
| Additives (EDTA, carrageenan) | 0.6 |
| Parfum | as required |
| Water | to 100 | pH 7.0

| Example D O/W cream | wt % |
|---|---|
| Sodium cetyl stearyl sulfate | 0.3 |
| Sorbitan monostearate | 2 |
| Cetyl alcohol | 1 |
| C$_{12-15}$ Alkyl benzoate | 2 |
| Shea butter | 0.5 |
| Caprylic acid/capric acid triglycerides | 3 |
| Dicaprylyl carbonate | 2 |
| Dicaprylyl ether | 1 |
| Ethylhexyl cocoate | 1 |
| Isohexadecane | 1 |
| Citric acid sodium salt | as required |
| Phenoxyethanol | 0.8 |
| Dipropylene glycol | 1 |
| Benzyl alcohol | 0.3 |
| Glycyrrhiza inflata extract (licochalcone A) | 0.1 |
| Ethylhexylglycerol | 0.4 |
| Hydroxypropyl starch phosphate | 2 |
| EDTA | 0.2 |
| Ethanol | 1 |
| Glycerol | 5 |
| Additives (EDTA, locust bean gum) | 0.6 |
| NaOH$_{aq}$ | as required |
| Parfum | as required |
| Water | to 100 | pH 5.2

| Example E O/W Cream | wt % |
|---|---|
| Potassium cetyl phosphate | 1 |
| Glyceryl stearate | 2 |
| Cetearyl alcohol | 1 |
| Caprylic acid/capric acid triglycerides | 2 |
| C$_{12-15}$ Alkyl benzoate | 2 |
| Sunflower oil | 0.5 |
| Coconut glycerides | 2 |
| Octyldodecanol | 1 |
| Triisostearin | 1 |
| Cetearyl isononanoate | 1 |
| Methyl p-hydroxybenzoate (paraben) | 0.2 |
| Hydroxypropyl starch phosphate | 1.5 |
| Octanediol | 0.2 |
| 4-hydroxyacetophenone | 0.2 |
| Glycerol | 5 |
| Panthenol | 1 |
| Additives (hydroxypropylmethylcellulose, BHT) | 0.5 |
| Parfum | as required |
| Water | to 100 |

What is claimed is:

1. A cosmetic emulsion, wherein the emulsion is an O/W emulsion which contains 0% acrylate-based polymers and is free of silicone oils and comprises, based on a total weight of the emulsion:
    (a) from 0.05% to 2.0% by weight of at least one substance selected from sodium stearoyl glutamate, alkali metal alkyl sulfates and alkali metal alkyl phosphates, wherein the alkyl group has in each case 16 to 18 carbon atoms,
    (b) from 0.2% to 5.0% by weight of hydroxypropyl starch phosphate,
    (c) from 0.2% to 3.0% by weight of glycerol monostearate and/or sorbitan monostearate,
    (d) from 5% to 15% by weight of glycerol,
    (e) from 70% to 90% by weight of water,
    (f) from 0.5% to 3% by weight of one or more fatty alcohols having from 14 to 22 carbon atoms.

2. The cosmetic emulsion of claim 1, wherein (a) comprises sodium stearoyl glutamate.

3. The cosmetic emulsion of claim 1, wherein (a) comprises one or more of sodium cetyl sulfate, sodium stearyl sulfate, and sodium cetearyl sulfate.

4. The cosmetic emulsion of claim 1, wherein (a) comprises one or more alkali metal alkyl phosphates.

5. The cosmetic emulsion of claim 4, wherein (a) comprises potassium cetyl phosphate.

6. The cosmetic emulsion of claim 1, wherein the emulsion comprises from 0.2% to 2.5% by weight of (c), based on a total weight of the emulsion.

7. The cosmetic emulsion of claim 1, wherein the emulsion further comprises one or more of waxes and oils based on hydrocarbons; saturated, unsaturated or hardened triglycerides; dialkyl ethers having from 12 to 24 carbon atoms; esters of monohydric alcohols and monocarboxylic acids having at least 10 carbon atoms.

8. The cosmetic emulsion of claim 1, wherein the emulsion comprises a total of from 0% to 2% by weight of further surfactants and/or emulsifiers, based on a total weight of the emulsion.

9. The cosmetic emulsion of claim 1, wherein hydroxypropyl starch phosphate is the only thickener present in the emulsion.

10. The cosmetic emulsion of claim 1, wherein the emulsion further comprises octyldodecanol.

11. The cosmetic emulsion of claim 1, wherein the emulsion further comprises one or more of 2-methylpropane-1,3-diol, 1,2-pentanediol, 1,2-hexanediol, 1,2-octanediol, glyceryl caprylate, 1,2-decandiol.

\* \* \* \* \*